(12) United States Patent
Dewan

(10) Patent No.: US 11,607,970 B2
(45) Date of Patent: Mar. 21, 2023

(54) MOBILE POWER STORAGE, TRANSPORT AND DISTRIBUTION SYSTEM

(71) Applicant: Mohan Dewan, Pune (IN)

(72) Inventor: Mohan Dewan, Pune (IN)

( * ) Notice: Subject to any disclaimer, the term of this patent is extended or adjusted under 35 U.S.C. 154(b) by 422 days.

(21) Appl. No.: 16/646,256

(22) PCT Filed: Sep. 26, 2018

(86) PCT No.: PCT/IB2018/057430
§ 371 (c)(1),
(2) Date: Mar. 11, 2020

(87) PCT Pub. No.: WO2019/064188
PCT Pub. Date: Apr. 4, 2019

(65) Prior Publication Data
US 2020/0276926 A1    Sep. 3, 2020

(30) Foreign Application Priority Data

Sep. 27, 2017  (IN) .............................. 201721034362
Nov. 3, 2017   (IN) .............................. 201721039299

(51) Int. Cl.
| | |
|---|---|
| *H02J 7/00* | (2006.01) |
| *H02J 7/14* | (2006.01) |
| *B60L 53/80* | (2019.01) |
| *B60L 53/51* | (2019.01) |
| *B60L 50/60* | (2019.01) |
| *B60P 3/00* | (2006.01) |

(Continued)

(52) U.S. Cl.
CPC .............. *B60L 53/80* (2019.02); *B60L 50/66* (2019.02); *B60L 53/51* (2019.02); *B60P 3/00* (2013.01); *B65G 1/10* (2013.01); *B65G 61/00* (2013.01); *B65G 67/04* (2013.01); *G05B 15/02* (2013.01); *H02J 7/0013* (2013.01); *H02J 7/0042* (2013.01); *B65G 2814/0302* (2013.01)

(58) Field of Classification Search
CPC .. B60P 3/00; B60L 53/51; B60L 53/80; B60L 50/66; B65G 61/00; H02J 7/0013; H02J 7/0042
USPC .................................................. 320/104, 109
See application file for complete search history.

(56) References Cited

U.S. PATENT DOCUMENTS 5,711,648 A * 1/1998 Hammerslag ........... B60L 50/66
                                                         180/68.5
6,094,028 A *  7/2000 Gu ........................ H01M 10/441
                                                         320/109

(Continued)

*Primary Examiner* — Alexis B Pacheco
(74) *Attorney, Agent, or Firm* — Sand, Sebolt & Wernow Co., LPA

(57) ABSTRACT

The present disclosure envisages a mobile power storage, transport and distribution system (100). The system (100) comprises a plurality of storage container units (200), a plurality of energy storage elements (206), a power station (102), and loading means (111), and transportation means (105). The power station (102) is configured to generate electrical power and charge the plurality of energy storage elements (206). The loading means (111) is configured to load each of the storage container units (200). The transportation means (105) is configured to transport the storage container units (200) from the power station (102) to the power consumption centers (104) in need of power and a discharged storage container units (200) back to the power station (102) for recharging energy storage elements (206).

15 Claims, 6 Drawing Sheets

(51) Int. Cl.
*B65G 1/10* (2006.01)
*B65G 61/00* (2006.01)
*B65G 67/04* (2006.01)
*G05B 15/02* (2006.01)

(56) References Cited

U.S. PATENT DOCUMENTS

| | | | | |
|---|---|---|---|---|
| 9,187,004 | B1* | 11/2015 | Davis | B60L 53/30 |
| 9,815,633 | B1* | 11/2017 | Kisser | G06Q 10/0832 |
| 10,919,162 | B2* | 2/2021 | Sohmshetty | B25J 9/162 |
| 11,267,653 | B2* | 3/2022 | Helsel | B66F 9/12 |
| 2006/0012334 | A1* | 1/2006 | Watson | B60L 58/15 |
| | | | | 320/112 |
| 2007/0113921 | A1* | 5/2007 | Capizzo | B60L 53/305 |
| | | | | 141/231 |
| 2009/0198372 | A1* | 8/2009 | Hammerslag | B60L 50/66 |
| | | | | 700/226 |
| 2010/0141206 | A1* | 6/2010 | Agassi | H01M 50/202 |
| | | | | 320/109 |
| 2010/0181129 | A1* | 7/2010 | Hamidi | B60L 53/80 |
| | | | | 180/68.5 |
| 2012/0271758 | A1* | 10/2012 | Jammer | B60L 53/68 |
| | | | | 701/22 |
| 2012/0303397 | A1* | 11/2012 | Prosser | B60L 53/18 |
| | | | | 705/7.12 |
| 2013/0030581 | A1 | 1/2013 | Luke et al. | |
| 2014/0002019 | A1* | 1/2014 | Park | B60L 50/66 |
| | | | | 320/109 |
| 2016/0368464 | A1* | 12/2016 | Hassounah | B60L 53/80 |
| 2017/0100837 | A1* | 4/2017 | Zevenbergen | B25J 9/1674 |
| 2017/0141368 | A1* | 5/2017 | Ricci | H01G 11/78 |
| 2019/0381910 | A1* | 12/2019 | Akhavan-Tafti | B60L 53/62 |
| 2021/0347275 | A1* | 11/2021 | Chakraborty | G06Q 20/127 |

* cited by examiner

MOBILE POWER STORAGE, TRANSPORT AND DISTRIBUTION SYSTEM

FIELD

The present invention relates to the field of mobile power storage, transport and distribution systems.

Definitions

As used in the present disclosure, the following terms are generally intended to have the meaning as set forth below, except to the extent that the context in which they are used indicate otherwise.

The expression 'SOC (state of charge)' used hereinafter in the specification refers to the percentage of the maximum possible charge that is present inside a rechargeable battery.

The expression 'storage units' used hereinafter in the specification refers to but is not limited to a charge storage component such as battery cells, capacitors.

The expression 'SOH' used hereinafter in the specification refers to but is not limited to a figure of merit of the condition of the storage component.

These definitions are in addition to those expressed in the art.

BACKGROUND

The background information herein below relates to the present disclosure but is not necessarily prior art.

Typically, mobile power generators generate power for a short term use. This generated power is either used by a single consumer for an event or by a load located at a remote location. These mobile power generators have engines which are driven by diesel for generating power. Generally, the mobile power generators are used as an add-on power or for supplying power to locations where transmission of cabled power is not available from utility companies. However, these mobile generators require fuel to run.

Generally, power is transmitted from power stations such as coal power stations, hydro power stations, nuclear power stations, and the like to a power consumption center via a grid. This grid is made of transmission towers with pylons and cables connected across the pylons. The cables are generally secured across these pylons of the transmission towers by various fitments. However, these transmission towers occupy a footprint and there is frequent breakdown of these transmission systems because of stormy weather and winds. Further, the system is subjected to electrical losses from the cables. Also, the generated power is prone to theft.

Further, the power stations supply power to distribution centers such as in townships also called as substations. At the substations there are transformers and accumulators present where some power is stored and step down and is supplied via a high tension cables (HT) and low tension cables (LT) to a final consumer. Further, the power from the substation is distributed via a secondary network to individual consumers which are either domestic and/or industrial. The primary network or the secondary network forms the part of the grid.

Again conventionally, alternate energy generators are also known. These generators generate power and either supply the generated power locally to one or more consumers or feed the generated power into the grid. As the grid remains the same and further storage, transmission and distribution of power with all its losses, thefts and its capex and opex is deterrent to efficiently receiving power by the final consumer. In addition there are frequent outages and because of vast nature of the grid there is little control on quantity and quality of power reaching the final consumer.

Therefore, there is a need to develop a mobile power storage, transport and distribution system that alleviates aforementioned drawbacks.

OBJECTS

Some of the objects of the present disclosure, which at least one embodiment herein satisfies, are as follows:

An object of the present disclosure is to provide a mobile power storage, transport and distribution system;

Another object of the present disclosure is to provide a system which minimizes losses.

Another object of the present disclosure is to provide a system which is economical.

Another object of the present disclosure is to provide a system which includes a storage bank container that provides power as per the demands without using complicated wiring.

Yet another object of the present disclosure is to provide a plug and play type power delivery system.

An object of the present disclosure is to provide a system that is highly reliable.

Another object of the present disclosure is to provide a system, which transports power over long distance without requiring infrastructure such as transmission towers, poles etc.

Yet another object of the present disclosure is to provide a system which provides optimum power management.

Other objects and advantages of the present disclosure will be more apparent from the following description, which is not intended to limit the scope of the present disclosure.

SUMMARY

The present disclosure envisages a mobile power storage, transport and distribution system. The system comprises a plurality of storage container units, a plurality of energy storage elements, a power station, and transportation means. The plurality of energy storage elements stored within the storage container units. The power station configured to generate electrical power and charge the plurality of energy storage elements. The loading means present at the power station and at the power consumption centers. The loading means is configured to load the charged energy storage elements into each of the storage container units and is further configured to offload a plurality of discharged storage elements from the storage container units. The transportation means is configured to transport storage container units from the power station to the power consumption centers in need of power and discharged storage container units from the power consumption center towards the power station for recharging.

In an embodiment, each of the storage container units includes a plurality of compartments, and a conductor network. Each of the compartments is configured to receive an energy storage element. Each of the compartments includes a plurality of storage container unit terminals for charging and discharging the energy storage elements housed in a compartment. The conductor network is configured to electrically connect all terminals in the storage container units to each other.

In an embodiment, the storage container units include a plurality of bas bars. The bus bar is coupled to the plurality of conductors to arrange the energy storage elements either in a series configuration or in a parallel configuration.

In an embodiment, the bus bar is configured on compartment of each of the storage container units in a swivel configuration. The bus bar is further configured to facilitate locking of the energy storage elements.

In an embodiment, the compartments are detachable from adjacent compartments to increase or decrease the number of compartments.

In an embodiment, the compartments include cells. Each of the cells can be attached or detached to vary the size of storage container unit itself.

In an embodiment, each compartment is configured to store one or a plurality of energy storage elements.

In an embodiment, the power station includes charging equipment, a charging rack rail, and the loading means. The charging equipment configured to charge each of the energy storage elements. The charging rack rail is configured to sort the energy storage elements sequentially and is further configured to charge in a first in first out charging mode or in a simultaneous charging mode. The loading means is configured to load each of the storage container units on the transportation means.

In an embodiment, the system includes a container power control and management unit configured to compute the power requirements of a power consumption center. The container power control and management unit is further configured to compute the number charged energy storage elements required at the power consumption center.

In an embodiment, the container power control and management unit is configured to transmit the number of energy storage elements upon receiving request from said power consumption center.

In an embodiment, the rack rail includes a plurality of slots and a conveyor mechanism. The slots are configured on the conveyor mechanism. The slots are configured to receive the energy storage elements.

In an embodiment, the power station has a first loading means and the power consumption center includes a second loading means. Each of the first loading means and the second loading means includes a first control unit, a first actuator, a second control unit, and a second actuator. The first control unit and the first actuator are configured to lift the storage units and is further configured to place the storage container units onto each of the trailers and the second control unit and the second actuator are configured to load the energy storage elements from the trailers into plurality of slots present at the power consumption center and is further configured to load the discharged energy storage elements back to the storage container units.

In an embodiment, the transportation means includes a charged trailer and a horse. The charged trailer is configured to provide the charged or discharged storage elements as per requirement. The horse is configured to drive the charged trailer to the power consumption center.

In an embodiment, the power station is coupled with at least one renewable power source, a non-renewable power source or a grid or a combination thereof.

In an embodiment, a plurality of solar panels is mounted on the storage container units to drive the horse.

In an embodiment, the energy storage elements are configured to power the horse while commuting from the power station to the power consumption center.

In an embodiment, the energy storage elements is configured to power the horse via a collective residuary power left in the energy storage elements from the power consumption center back towards the power station.

BRIEF DESCRIPTION OF THE ACCOMPANYING DRAWING

A mobile power storage, transport and distribution system, of the present disclosure, will now be described with the help of the accompanying drawing, in which.

LIST OF REFERENCE NUMERALS

Figure 1:
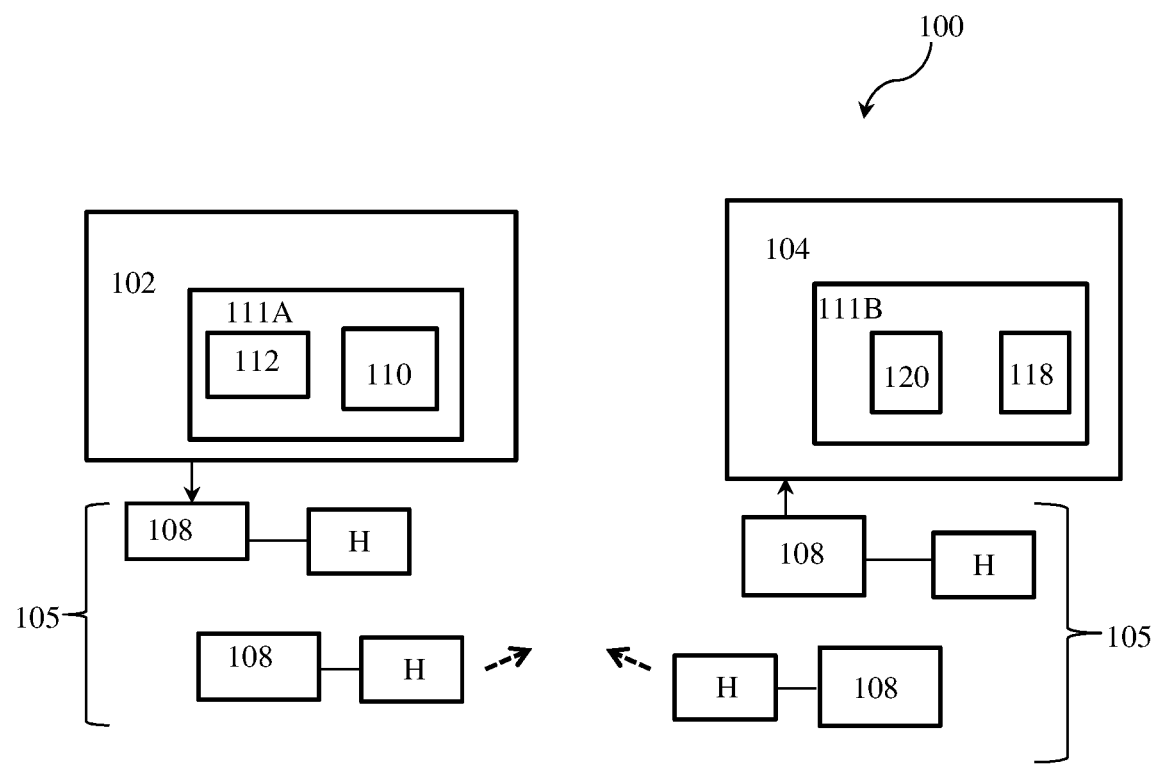
FIG. 1 illustrates a block diagram of a mobile power storage, transport and distribution system, in accordance with an embodiment of the present disclosure.

100—System
102—Power Station
104—Power consumption center
105—Transportation Means
H—Horse
T/108—Trailer
110—First Control Unit
111—Loading Means
111A—First Loading Means
111B—Second Loading Means
112—First Actuator
118—Second Control Unit
120—Second Actuator
200—Storage Bank Container Unit
202—Compartments
204—Cells
206—Energy Storage Elements/Sub-Unit
208—Bus Bar
210—Swivel Mechanism

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" is intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps is employed.

When an element is referred to as being "mounted on," "engaged to," "connected to," or "coupled to" another element, it is directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms is only used to distinguish one element, component, region, layer or section from another component, region, layer or section. Terms such as first, second, third etc., when used herein do not imply a specific sequence or order unless clearly suggested by the present disclosure.

Terms such as "inner," "outer," "beneath," "below," "lower," "above," "upper," and the like, issued in the present disclosure to describe relationships between different elements as depicted from the figures.

The present disclosure envisages a mobile power storage, transport and distribution system in accordance with an embodiment of the present disclosure. The mobile power storage, transport and distribution system (hereinafter referred as system 100) is discussed with reference to FIG. 1 to FIG. 6.

The system 100 comprises a plurality of storage container units 200, a plurality of energy storage elements 206, a power station 102, and transportation means 105.

Figure 2:
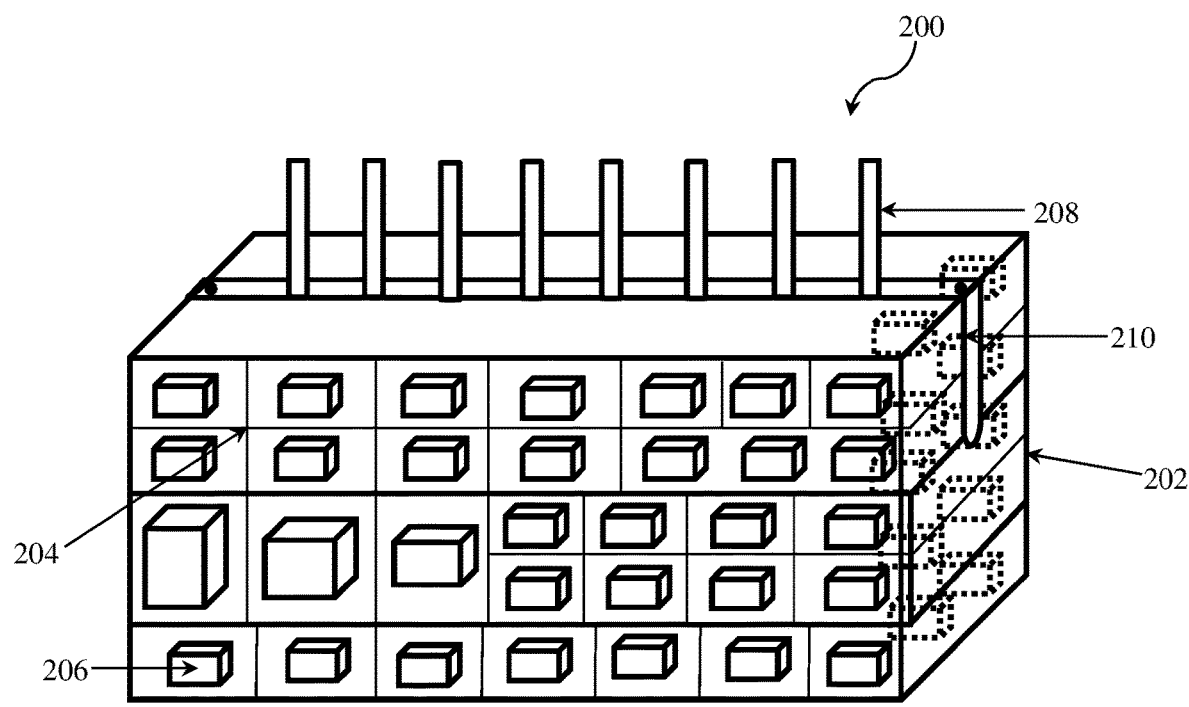
FIG. 2 illustrates a schematic view of a storage bank container, in accordance with an embodiment of the present disclosure.
Figure 3A:
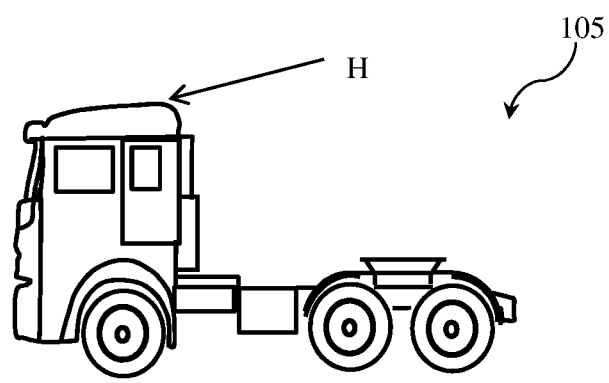
FIG. 3A illustrates a schematic view of a horse of the system of FIG. 1, in accordance with an embodiment of the present disclosure.
Figure 3B:
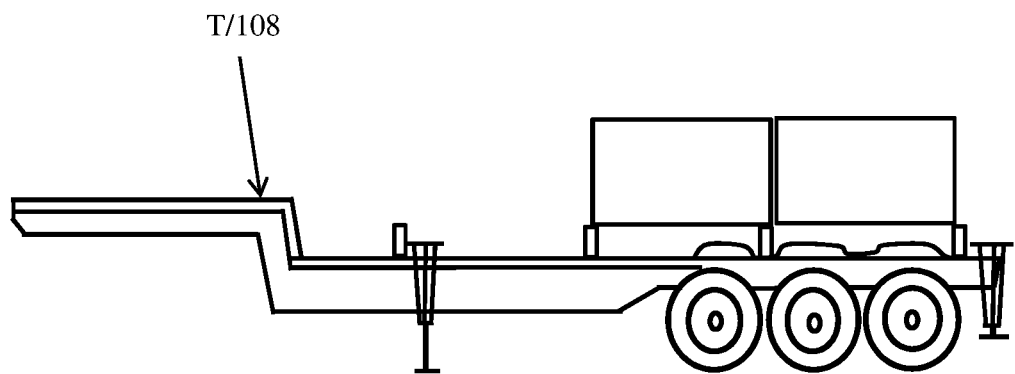
FIG. 3B illustrates a schematic view of a trailer of the system of FIG. 1, in accordance with an embodiment of the present disclosure.
Figure 4:
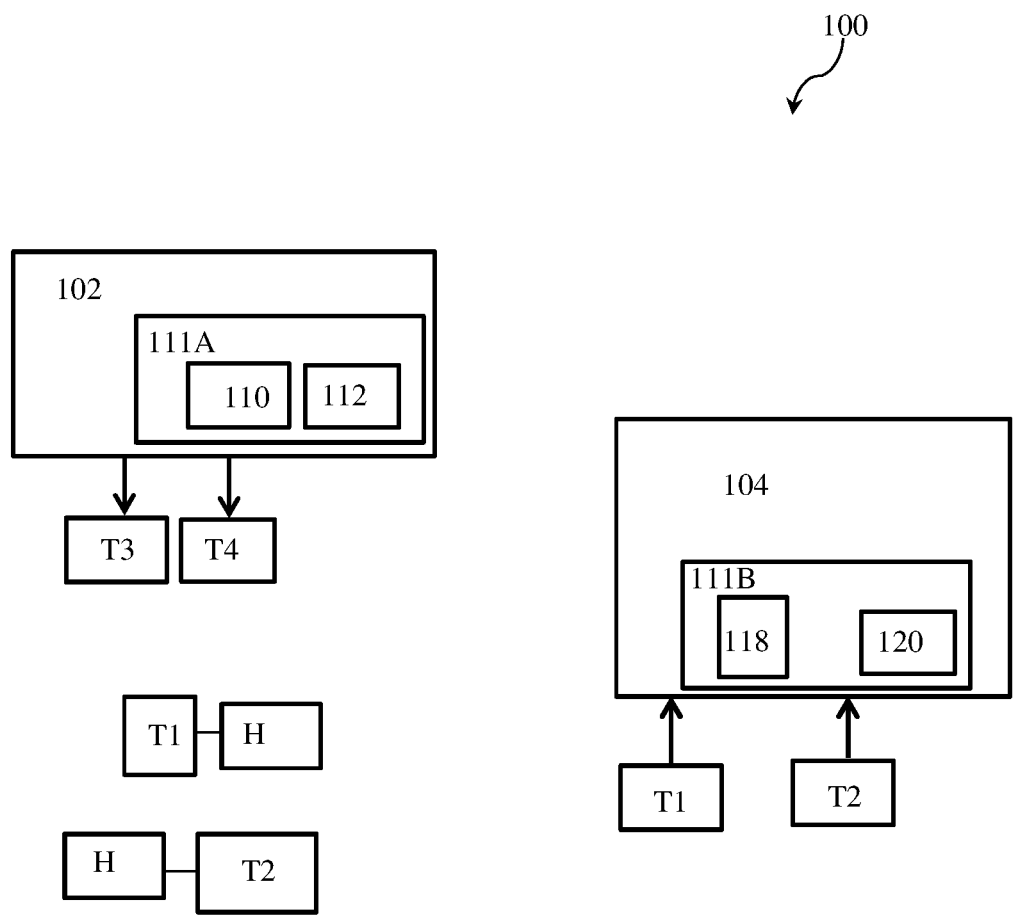
FIG. 4 illustrates a block diagram of the mobile power storage, transport and distribution system in accordance with a first aspect of the present disclosure.

FIG. 2 illustrates a storage bank container unit 200. The plurality of energy storage elements 206 are stored within the storage container units 200. The power station 102 is configured to generate electrical power and is further configured to charge the plurality of energy storage elements 206. The loading means 111 is present at the power station 102 and at the power consumption centers 104. The loading means 111 is configured to load the charged energy storage elements 206 into each of the storage container units 200 and is further configured to offload a plurality of discharged storage elements 206 from the storage container units 200. The transportation means 105 is configured to transport the storage container units 200 from the power station 102 to the power consumption centers 104 which are in need of power and the discharged storage container units 200 from the power consumption centers 104 towards the power station 102 for recharging.

Each of the storage container units 200 includes a plurality of compartments 202, and a conductor network. Each of the compartments 202 is configured to receive an energy storage element 206. Each of the compartments 202 includes a plurality of storage container unit 200 terminals for charging and discharging the energy storage elements 206 housed in the compartment 202. The conductor network is configured to electrically connect all terminals in the storage container units 200 to each other. In an embodiment, the compartments 202 are detachable from adjacent compartments 202 to increase or decrease the number of compartments. The compartments 202 include cells 204. Each of the cells 204 can be attached or detached to vary the size of storage container unit itself. Each compartment 202 is configured to store one or a plurality of energy storage elements 206.

In an embodiment, the storage container units 200 include a plurality of bas bars 208. The bus bar 208 is coupled to the plurality of conductors to arrange the energy storage elements 206 either in a series configuration or in a parallel configuration.

In an embodiment, the bus bar 208 is configured on compartment 202 of each of the storage container units 200 in a swivel configuration. The swivel mechanism 210 is configured to control the swiveling motion of the bus bars 208. In an embodiment, the bus bars 208 are configured to operate in a locking mode and an unlocking mode. In the locking mode, the bus bars 208 is configured to provide electrical connections between the storage elements 206 and is further configured to facilitate locking of the energy storage elements 206.

In an embodiment, the power station 102 includes charging equipment (not shown in the figures), a charging rack rail (not shown in the figures), and the loading means 111. The charging equipment configured to charge each of the energy storage elements 206. The charging rack rail (not shown in the figures) is configured to sort the energy storage elements 206 sequentially and is further configured to charge in a first in first out charging mode or in a simultaneous charging mode. The loading means 111 is configured to load each of the storage container units 200 on the transportation means 105.

In an embodiment, the system 100 includes a container power control and management unit (not shown in the figures) configured to compute the power requirements of a power consumption center 104. The container power control and management unit (not shown in the figures) is further configured to compute the number of charged energy storage elements 206 required at the power consumption center 104.

In an embodiment, the container power control and management unit is configured to dislodge the number of energy storage elements 206 upon receiving request from said power consumption center 104.

In an embodiment, the rack rail includes a plurality of slots and a conveyor mechanism. The slots are configured on the conveyor mechanism. The slots are configured to receive the energy storage elements 206. The charging rack rail (not shown in the figures) is configured to operate in a first in first out charging mode or in a simultaneous charging mode. The charging rack rail includes a plurality of slots and conveyor mechanism. The plurality of slots is configured on the conveyor mechanism. The discharged storage bank container unit 200 is transferred from the trailer (T1/108) to the power station 102. The first control unit 110 and the first actuator mechanism 112 is configured to offload the discharged storage bank container unit 200 from the trailer (T1/108) and is further configured to place the discharged storage bank container unit 200 in a slot of the plurality of slots present at the power consumption centers 104.

In an embodiment, the power station 102 has a first loading means 111A and the power consumption center includes a second loading means 111B. Each of the first loading means 111A and the second loading means 111B includes a first control unit 110, a first actuator 112, a second control unit 118, and a second actuator 120. The first control unit 110 and the first actuator 112 are configured to lift the storage container units 200 and is further configured to place the storage container units 200 onto each of the trailers (T1/108) and the second control unit 118 and the second actuator 120 are configured to load the energy storage elements 206 from the trailers (T1/108) into plurality of slots present at the power consumption center 104 and is further configured to offload the discharged energy storage elements 206 back to the storage container units 200.

In an embodiment, the transportation means 105 includes the charged trailer T1 and the horse H. The charged trailer T1 is configured to provide the charged or discharged storage elements 206 as per requirement. The horse H is configured to drive the charged trailer T1 to the power consumption center 104.

In an embodiment, the power station 102 is coupled with at least one renewable power source, a non-renewable power source or a grid or a combination thereof. In an embodiment, a plurality of solar panels is mounted on the storage container units to drive the horse H.

In an embodiment, the energy storage elements 206 are configured to power the horse H while commuting from the power station 102 to the power consumption center 104. In another embodiment, the energy storage elements 206 is configured to power the horse H via a collective residuary power left in the energy storage elements 206 from the power consumption center 104 back towards the power station 102.

Further, the container power control and management unit is configured to continuously receive a State of Health (SOH) and a State of Charge (SOC) value regarding the consumer power unit 104 and/or the intermediate power hanger(s) (104A and 104B) from each of the charged trailers (T1/108) and may be further configured to generate and provide instructions to each of the charged trailers (T1/108), during their journey towards the power consumption centers 104 their SOC and SOH values.

Figure 6:
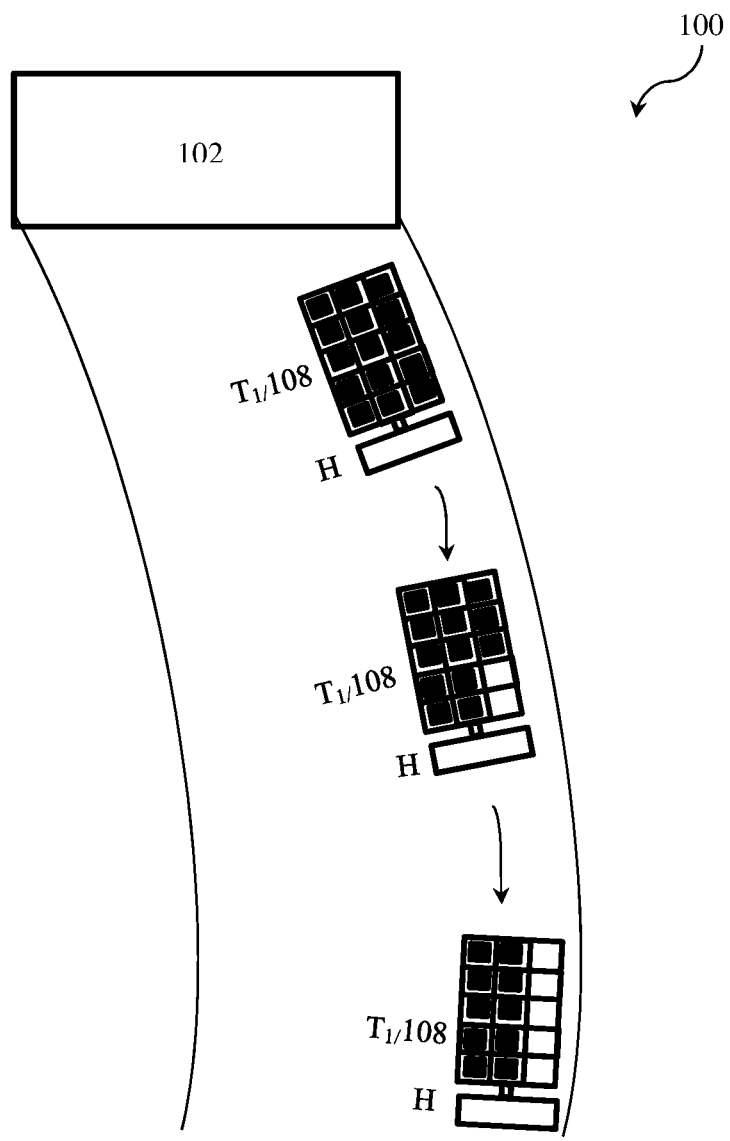

FIG. 6 illustrates a schematic diagram of the system 100, in accordance with a first aspect of the present disclosure.

In an embodiment, the horse H is coupled to the charged trailer (T1/108) and starts its journey from the power station 102. In an embodiment, the charged storage bank container unit 200, of the trailer (T1/108) stores around 25 Megawatts (MIN) of power.

The trailer (T1/108) operates in a compaction mode and a decompaction mode. In an embodiment, the trailer (T1/108) may be transported from one location to another location using a railway engine via a railway track, wherein multiple trailers are connected to each other carrying storage container units 200 to form a power train. In another embodiment, the trailer (T1/108) may be transported from one location to another location using a ship. The trailer (T1/108) can be fully loaded with elements or partially loaded and balance space can be used for transporting goods or for carriage of humans.

In the decompaction mode:
the horse H is attached to the charged trailer (T1/108) and commutes between the power station 102, and the power consumption center 104; and
container power control and management unit is configured to instruct the container actuator mechanism of the charged trailer (T1/108) to automatically dislodge the required sub-units 206 at the power consumption center 104.

In the compaction mode:
while returning, the trailer (T1/108) with partially discharged sub units 206 commutes between the power consumption center 104 and the power station 102; and
container power control and management unit is configured to instruct the loading means 111 to automatically attach the partially discharged sub-units 206 from the power consumption center 104.

Figure 5:
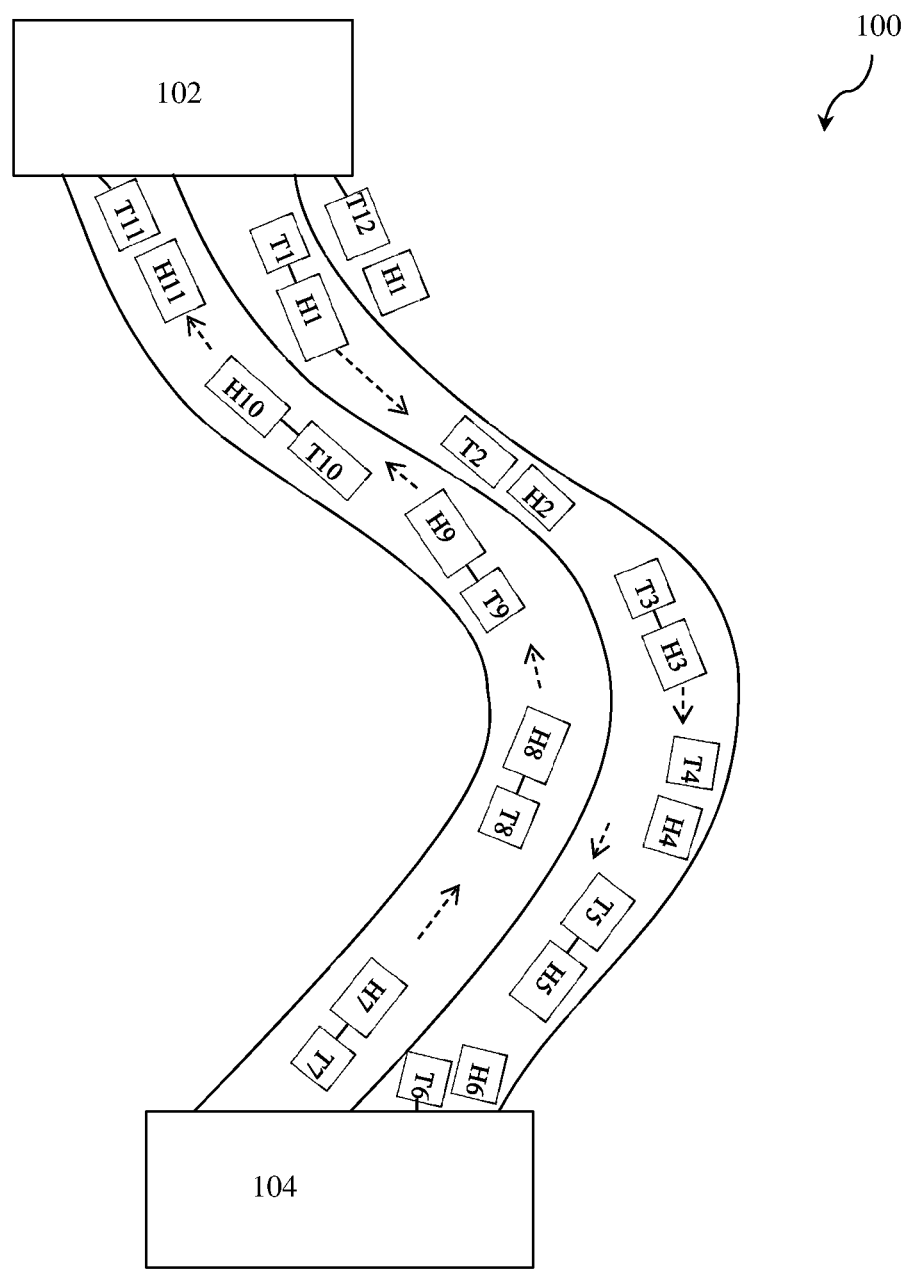
FIG. 5 and FIG. 6 illustrate a schematic diagram of the mobile power storage, transport and distribution system in accordance with a second aspect of the present disclosure.

In an embodiment, while commuting back towards the power station 102 from the power consumption center 104, the discharged trailers (T1/108) is configured to load the computed number of discharged sub-units 206 from the power consumption center 104 for further recharging at the power station 102, as depicted in FIGS. 5 and 6.

In an embodiment, the horse H while commuting from the power consumption center 104 to the power station 102 uses the remaining power present in the partially discharged sub-units 206. Thus the system 100 of the present disclosure facilitates an uninterrupted source of power to the power consumption center 104. Also, the system 100 of the present is economical as it eliminates the use of expensive transmission towers, power lines etc. The system 100 is having a plug and play type power delivery system. In an embodiment, the system 100 provides power as per demand without requirement of external wires.

The system 100 of the present disclosure is efficient to provide power directly to the distribution station or to the final consumer as compared to the conventional transmission system which require costly transformers and accumulators and high tension (HT) and low tension (LT) cables for transmission of power to the final consumer.

Technical Advancements

The present disclosure described herein above has several technical advantages including, but not limited to, the realization of a mobile power storage, transport and distribution system that:
minimizes losses;
transports power over long distance without requiring infrastructure such as transmission towers, poles etc.;
is having plug and play type power delivery system;
is economical;
is reliable; and
is used for providing power as per the demand without requirement of external wiring.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein is practiced and to further enable those of skill in the art to practice the embodiments herein. Accordingly, the examples should not be construed as limiting the scope of the embodiments herein The use of the expression "at least" or "at least one" suggests the use of one or more elements or ingredients or quantities, as the use is in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A mobile power storage, transport and distribution system comprising:
   a. a plurality of storage container units;
   b. a plurality of energy storage elements stored within said storage container units;
   c. a power station configured to generate electrical power and charge said plurality of energy storage elements;
   d. a loading means present at said power station and at power consumption centers, said loading means configured to load said charged energy storage elements into each of said storage container units and further configured to offload a plurality of discharged storage elements from said storage container units;
   e. transportation means configured to transport said storage container units from said power station to said power consumption centers in need of power and discharged storage container units from said power consumption centers towards said power station for recharging; and
   f. a container power control and management unit configured to compute the power requirements of said power consumption centers, wherein said container power control and management unit is configured to transmit the number of energy storage elements upon receiving a request from said power consumption centers,
   wherein said transportation means includes:
      a charged trailer configured to provide said charged or discharged storage elements as per requirement, and
      a propulsion means configured to drive said charged trailer to said power consumption centers,
      wherein the charged trailer operates in a compaction mode and a decompaction mode,
      wherein in the decompaction mode: the propulsion means is attached to the charged trailer and commutes between the power station and the power consumption centers, and the container power control and management unit is configured to instruct a container actuator mechanism of the charged trailer to automatically dislodge the required sub-units at the power consumption centers; and
      wherein in the compaction mode: while returning, the charged trailer with partially discharged sub units commutes between the power consumption centers and the power station, and the container power control and management unit is configured to instruct the loading means to automatically attach the partially discharged sub-units from the power consumption centers.

2. The system as claimed in claim 1, wherein each of said storage container units includes:
   a. a plurality of compartments, each of said compartments is configured to receive an energy storage element, wherein each of said compartments includes a plurality of storage container unit terminals for charging and discharging said energy storage elements housed in a compartment; and
   b. a conductor network configured to electrically connect all terminals in said storage container units to each other.

3. The system as claimed in claim 2, wherein said storage container units includes a plurality of bus bars, said bus bar is coupled to said plurality of conductors to arrange said energy storage elements either in a series configuration or in a parallel configuration.

4. The system as claimed in claim 3, wherein said bus bar is configured on compartment of each of said storage container units in a swivel configuration, said bus bar is further configured to facilitate locking of said energy storage elements.

5. The system as claimed in claim 2, wherein the compartments are detachable from adjacent compartments to increase or decrease the number of compartments.

6. The system as claimed in claim 5, wherein the compartments include cells, each of said cells can be attached or detached to vary the size of storage container unit itself.

7. The system as claimed in claim 2, wherein each compartment is configured to store one or a plurality of energy storage elements.

8. The system as claimed in claim 1, wherein said power station includes:
   a. charging equipment configured to charge each of the energy storage elements;
   b. a charging rack rail configured to sort the energy storage elements sequentially and further configured to charge in a first in first out charging mode or in a simultaneous charging mode;
   c. said loading means configured to load each of said storage container units on said transportation means.

9. The system as claimed in claim 1, wherein said system includes a container power control and management unit configured to compute the number charged energy storage elements required at the power consumption centers.

10. The system as claimed in claim 6, wherein said rack rail includes:
    a. a plurality of slots; and
    b. a conveyor mechanism,
       wherein said slots are configured on said conveyor mechanism, and said slots are configured to receive said energy storage elements.

11. The system as claimed in claim 1, wherein said power station has a first loading means and said power consumer center includes a second loading means, each of said first loading means and said second loading means includes:
    a. a first control unit;
    b. a second control unit;
    c. a first actuator; and
    d. a second actuator, wherein said first control unit said first actuator are configured to lift said storage unit and further configured to place said storage container units onto each of said trailers and said second control unit, and said second actuator are configured to load said energy storage elements from said trailers into plurality of slots present at said power consumption centers and further configured to load said discharged energy storage elements back to said storage container units.

12. The system as claimed in claim 6, wherein said power station is coupled with at least one renewable power source, a non-renewable power source or a grid or a combination thereof.

13. The system as claimed in claim 1, wherein a plurality of solar panels is mounted on said storage container units to drive said propulsion means.

14. The system as claimed in claim 1, wherein said energy storage elements are configured to power said propulsion means while commuting from said power station to said power consumption centers.

15. The system as claimed in claim 1, wherein said energy storage elements are configured to power said propulsion means via a collective residuary power left in said energy storage elements from said power consumption centers back towards said power station.

* * * * *